INVENTOR
HERMAN FARMER

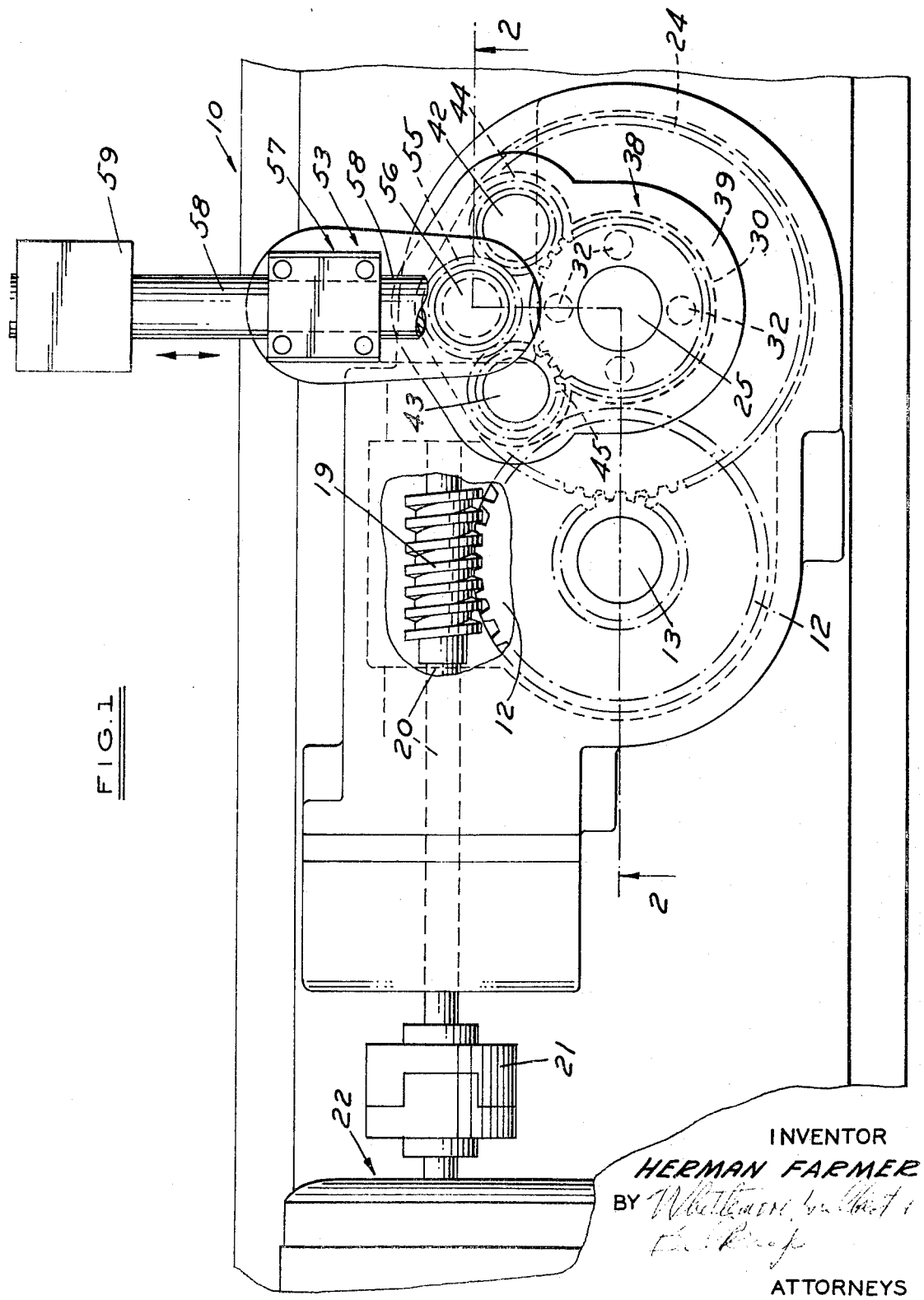

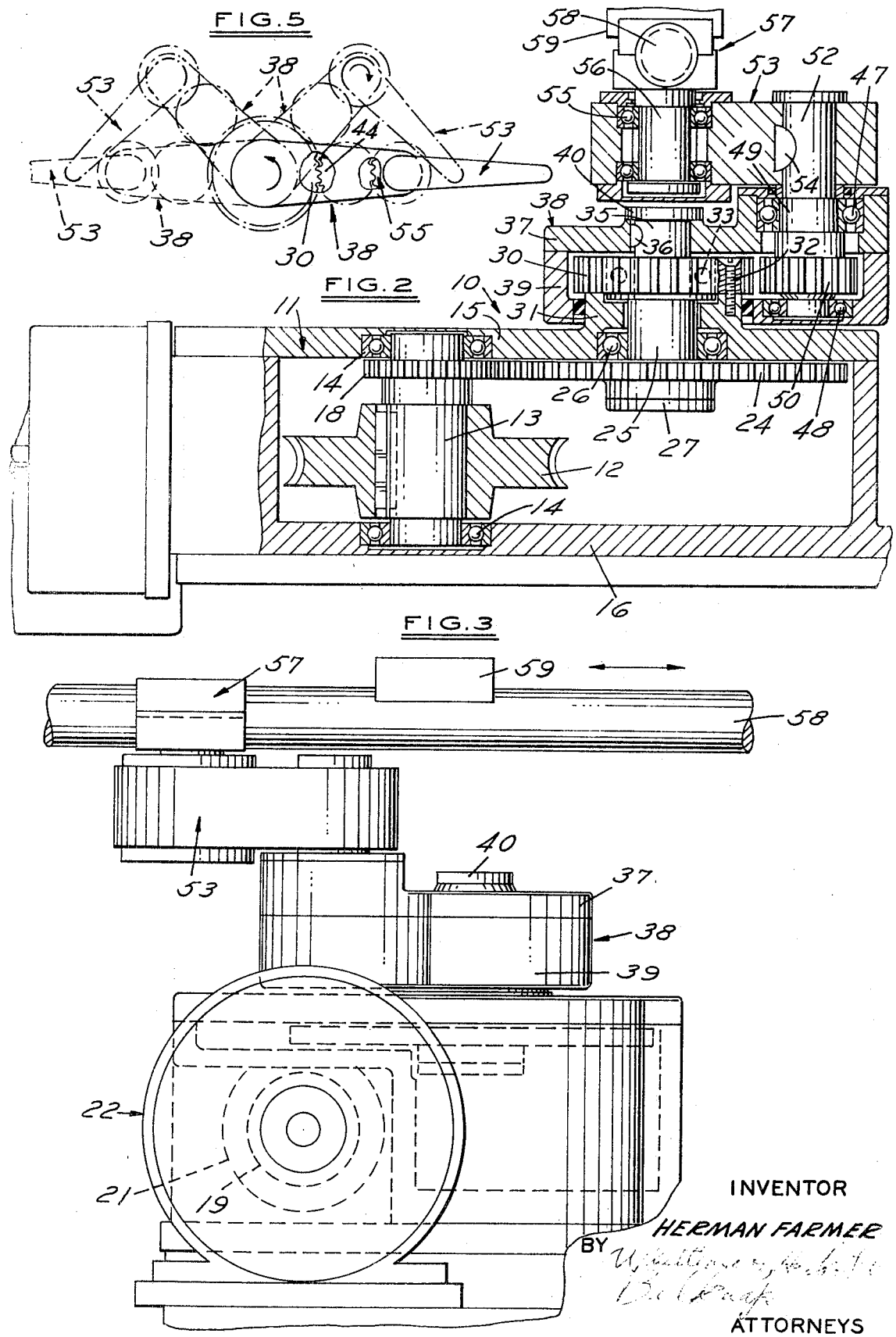

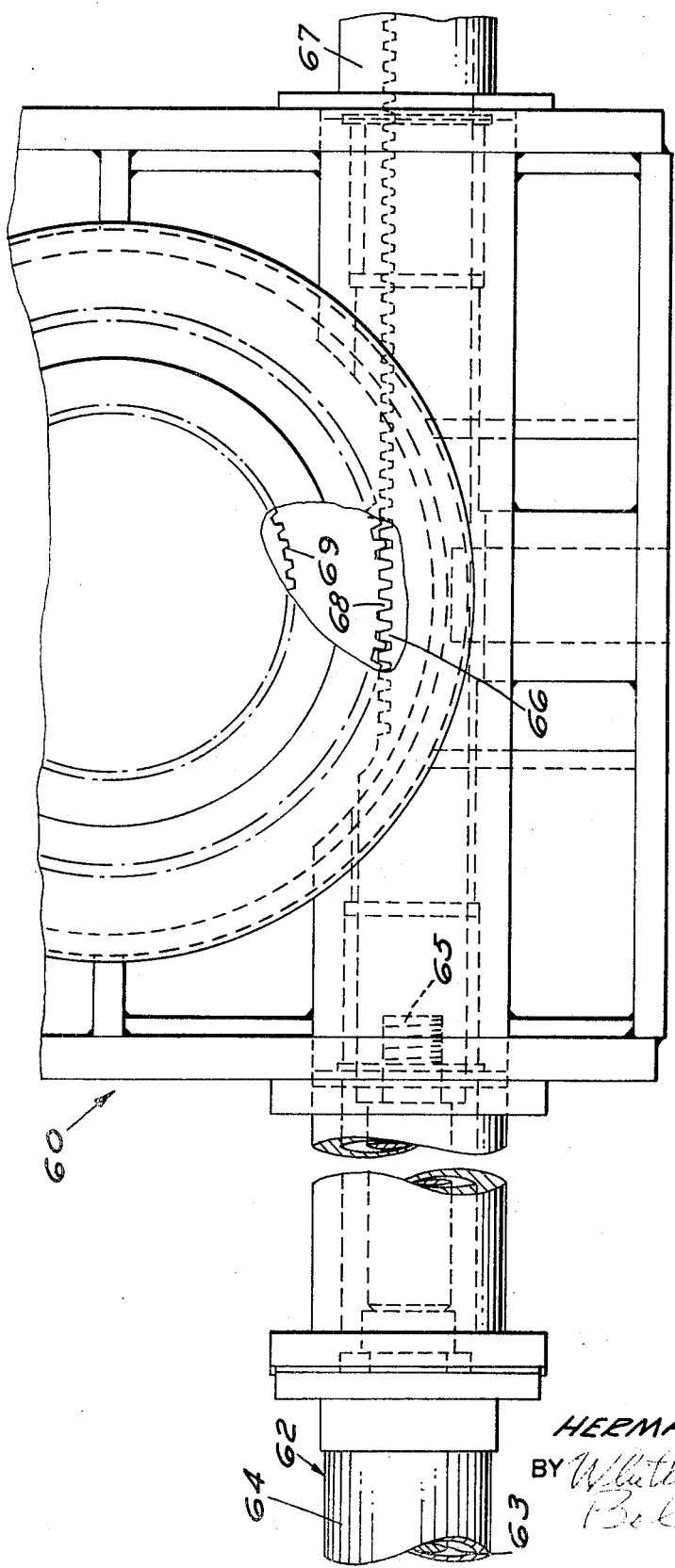

United States Patent Office 3,512,420
Patented May 19, 1970

3,512,420
HARMONIC MOTION DRIVE MECHANISM FOR TRANSFER BAR AND THE LIKE
Herman Farmer, Livonia, Mich., assignor, by mesne assignments, to Buhr Machine Tool Corporation, a corporation of Delaware
Filed Jan. 8, 1968, Ser. No. 700,325
Int. Cl. F16h 21/04
U.S. Cl. 74—25                                33 Claims

ABSTRACT OF THE DISCLOSURE

A transfer bar drive mechanism is disclosed for use in mass production automation or machine tool transfer equipment. An elongated transfer bar is reciprocated at a variable speed characteristic of a harmonic motion, in its action of first engaging behind a pallet-mounted workpiece, commencing a forward indexing motion of the latter from an effective rest condition at a gradually accelerating speed to a maximum speed over a medial portion of the transfer stroke, and then decelerating, again sinusoidally, to a halt at the end of the stroke. During this stroke the transfer bar indexes a workpiece from one of a series of machine tool stations to the next station.

---

Specifically, the transfer bar mechanism comprises a fixed horizontal base spur gear of substantial diameter and number of teeth and a main drive gear having a shaft projecting coaxially through and journaled in the fixed gear. The drive gear is powered by gearing at a reduction ratio which, in one embodiment employing a motorized worm and worm gear set, amounts to 120:1. In another embodiment the drive is effected through rack and pinion means, also at a large reduction; and other types of speed reduction drive are contemplated.

In any contemplated adaptation of the principle of the invention, the upright shaft of the main drive gear has a first horizontal operating arm fixed thereto, so that this arm rotates coaxially above the fixed gear, as driven by the main drive gear. The operating arm extends a considerable radial distance outwardly of its axis of rotation; and intermediate this length the arm journals the upright shaft of a first, idler pinion, which is in mesh with the fixed gear. The first operating arm also journals, adjacent its outer end, the upright shaft of a second, or operating pinion, whose teeth mesh with the teeth of the idler. Further pursuant to the invention, the two meshing pinions are equal in diameter and tooth number, which is half the number of teeth of the fixed gear.

A second operating arm of the mechanism, pivoted on the end of the first arm, is fixed to the shaft of the second or operating pinion to rotate therewith; and the transfer bar is pivoted on the end of the second arm. All pivotal axes of the mechanism are parallel and vertical. Pursuant to the invention the effective radial length of the second arm between the point at which it pivotally engages the transfer bar and its pivotal axis on the first arm is equal to the radial length of the first arm between the last named axis and the pivotal axis of the first arm coaxial with the fixed gear. These considerations of tooth number and dimension occasion the harmonic motion characteristic of the mechanism.

Upon a rotative drive of the main drive gear, the first operating arm rotating therewith, the idler pinion (two are actually disclosed herein but one will serve) planetes about the fixed base gear, being concurrently rotated to rotate the second or operating pinion at the same speed. The result of the compounding of the compensatory rotative effects is to cause the outer end of the second operating arm, and the transfer bar pivoted at that end, to follow a strictly rectilinear path in the indexing motion, with the variable-speed, harmonic characteristic of its stroke referred to.

Background of the invention—Field

As indicated above, the improved transfer bar mechanism finds its most important presently contemplated application to mass production equipment of the automated transfer type, in which palletized and very heavy castings, forgings or other workpieces are successively indexed past a longitudinally-spaced series of individual machine tools operating upon the workpieces when the latter come to a halt at the end of an indexing stroke. In this particular field the avoidance of heavy inertial effects, resistant both to acceleration and deceleration and undesirably overstressing parts under shock in both instances, is a main and very important advantage contributed by the improvement, as is also the simplicity, strength and compactness of the mechanism made possible by its shock-free action.

However, the latter is obviously well adapted for use in any setting, not just a machine tool one, in which the desirable characteristics of the harmonic motion lend themselves, particularly in the handling of heavy load units. In essence the invention deals with a mechanical motion of utility in many fields in which a stroke of the nature referred to above is desirable.

I am not aware of any prior art dealing with a harmonic motion transfer bar drive mechanism such as that of the invention, or any reasonable related type of mechanism.

Summary of the invention

This invention affords an improved transfer mechanism of great simplicity, compactness and strength, involving, in a preferred and illustrated embodiment, simple fixed and rotatable spur gear and/or pinion and pivoted arm components, the pinions riding about or planeting the fixed gear to produce a compounded and compensating rotation-to-rectilinear translation action at the transfer bar, translated load unit, or other point at which the useful funcion is performed.

Since any transfer bar mechanism, as employed in industrial transfer equipment, indexes very heavy loads from one machine tool station to another, i.e., as high as 30,000 pounds or more, severe inertial and shock forces are involved at the commencing and termination of the indexing stroke if the latter has known mechanical or hydraulic motivation. The improved harmonic drive of the invention avoids these stresses. The load is picked up gently, accelerated to maximum speed and decelerated gradually to a halt at the end of a long stroke and a very short time lapse.

In addition to the above advantageous attributes, the improved mechanism includes speed reduction gearing drivingly connecting its spur gear and arm train with a prime mover of one sort or another, as through a motor driven worm and worm gear set or through fluid pressure-operated rack and pinion means, by which the stroke length and speed of the transfer bar or its equivalent are properly related to the particular installation in which the mechanism is incorporated. Moreover, the design of the mechanism, in reference to gear and pinion diameters and tooth number, is such that overloading of the teeth of these members is avoided, hence relatively small size may be employed, at consequent lowered cost.

Still further, the design considerations are such that the mechanism may be produced in many different ratings in regard to required motor or other prime mover output capacity, stroke in terms of speed and distance, and the like. Loads in a range as high as 5,000 lbs.–30,000 lbs. are handled shock-free and with ease at stroke rates ranging, for example, from two feet per 1.5 seconds to five feet per 3 seconds. The prime movers may range from 5 horsepower to 25 horsepower in rating.

Brief description of the drawings

FIG. 1 is a fragmentary top plan view, partially broken away, of a version of the improved transfer mechanism in which a transfer bar is driven rectilinearly, as indicated by the double-headed arrow, from an electric motor through worm and worm gear speed reduction means;

FIG. 2 is a fragmentary view, partially cut away and in vertical section on broken line 2—2 of FIG. 1, illustrating reduction gear, operating gear and pinion, and operating arm components of the mechanism;

FIG. 3 is a fragmentary view in end elevation of the mechanism and the associated transfer bar, as from the left of FIG. 1;

FIG. 5 is a schematic plan view illustrating the operation of the mechanism as depicted in FIG. 4, with its arm, gear and pinion components shown in solid line at an initial phase of a single transfer advance and retract cycle, in dot-dash line at an intermediate phase continuously following the initial phase, and in dotted line at a final phase of the transfer advance at which the transfer motion ceases instantaneously; and FIG. 6 is a fragmentary top plan view illustrating another embodiment of the basic mechanism, in which the prime mover is an hydraulic cylinder or other fluid pressure-operated unit, power being transmitted to the mechanism through a rack and pinion set.

Description of preferred embodiments

Figure 4:
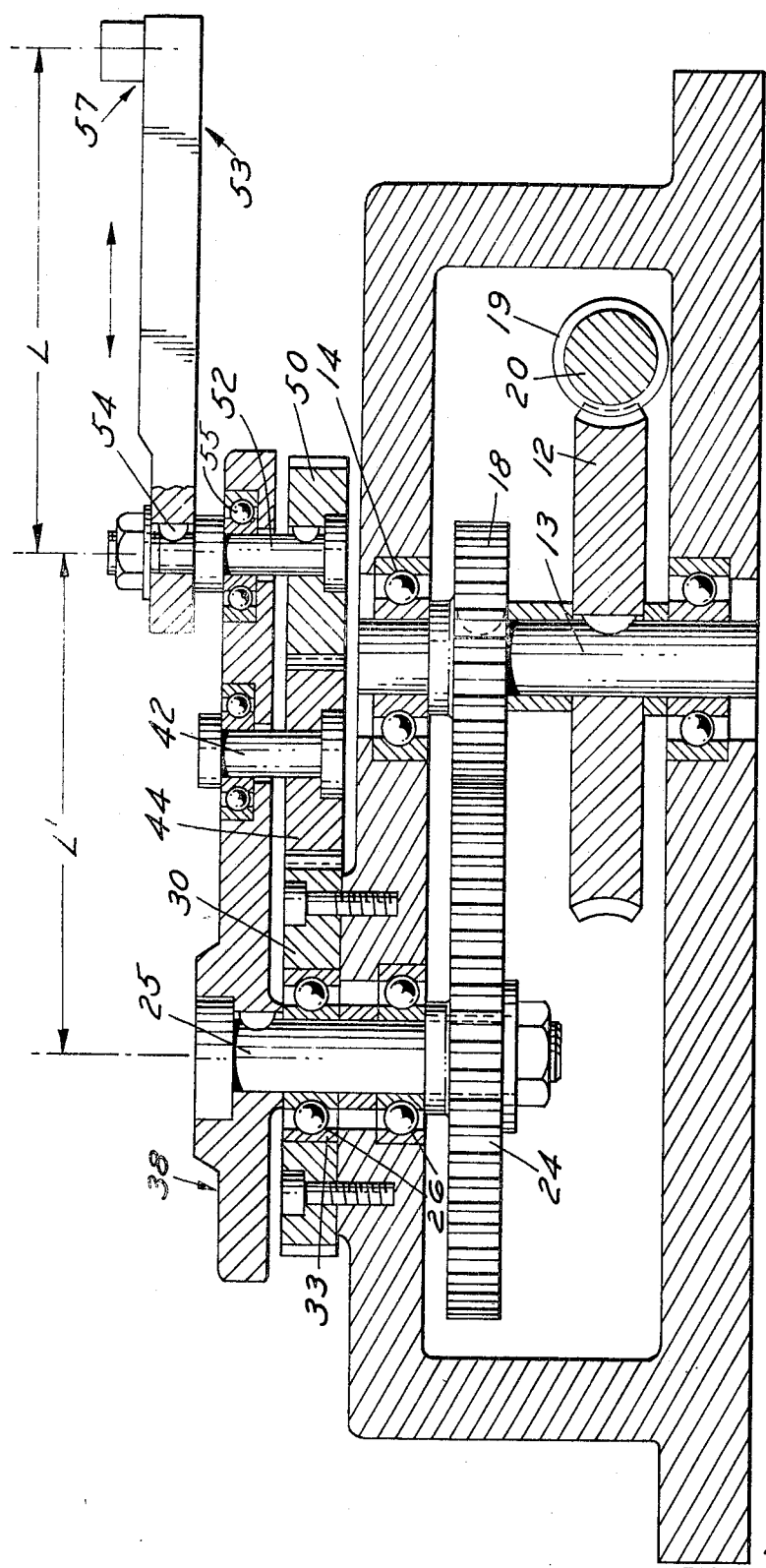
FIG. 4 is a schematic view in vertical cross section representing either a development of a two-idler pinion concept of the invention, such as that of FIGS. 1–3, or a single-idler embodiment whose gear and pinion axes are in a single vertical plane.

Referring to FIGS. 1, 2 and 3, the basic mechanism 10 of the invention is shown as being supported in and on a massive but compact housing 11, itself in turn stably supported by means not shown. In the adaptation 10 of the mechanism the housing 11 internally receives a worm gear 12 keyed to an upright stub shaft 13, which is journaled by ball bearings 14 in the top and bottom walls 15, 16, respectively, of the housing. A relatively small diameter power input spur gear or pinion 18 is keyed or otherwise fixed to stub shaft 13 above worm gear 12; and the action of pinion 18 will be hereinafter dealt with.

As best shown in FIG. 1, a worm 19 is fixedly mounted on an elongated drive shaft 20 suitably journaled in walls of the housing 11, in a manner not bearing on the invention, the worm and shaft being rotatively driven through an appropriate coupling 21 by an electric motor 22 rated adequately as described above. Worm 19 and worm gear 12 may be of any desired type, non-throated, single throated enveloping or double throated enveloping.

The power input pinion 18, as thus driven from prime mover 22, meshes with a large diameter spur gear 24, typically with a 3:1 reduction ratio. The reduction through the worm gear-worm set 12, 19 is typically 40:1, so that the overall reduction of rotative speed at gear 24 amounts illustratively to 120:1.

As best illustrated in FIG. 3, the gear 24 is fixed on an upright shaft 25, which is journaled, as by ball bearing 26 and suitable end thrust means 27, in the top housing wall 15. Shaft 25 extends upwardly above its bearing 26 through a fixed base spur gear 30 of, say, 64 teeth. This gear is shown as being anchored downwardly upon a top housing boss 31 (FIGS. 1 and 3) by screws 32; and the gear shaft 25 is secondarily journaled by a ball bearing 33 within an axial bore of the fixed base gear 30.

The top of shaft 25 is reduced in diameter at 35, where it is drivingly connected by a key 36 to a top member 37 of a two-part, first radial arm or operating member, generally designated 38, of the transfer mechanism. The other part 39 of the arm is rigidly secured by suitable means to arm part 37. A top flange 40 of shaft 25 assists in vertically sustaining the latter from above.

Referring now to FIG. 1 in supplementation of FIG. 3, the first operating member or arm 38 of the improved mechanism journals in its respective upper and lower parts 37, 39, a pair of upright shafts 42, 43, as by means of appropriate ball bearings (not shown); and each of the shafts 42, 43 has an idler spur gear member or pinion fixed thereon medially of the length of the shaft axis. The idlers are respectively designated 44 and 45, and each has, illustratively, 32 teeth. They mesh with the 64 teeth of the fixed gear 30 so that, upon rotation of gear 24 from the prime mover and attendant rotation of the first operating member or arm 38 keyed to shaft 25, the idlers 44, 45 travel planetarily about fixed gear 30.

Again considering FIG. 3 in conjunction with FIG. 1, the top and bottom members 37, 39, respectively, of the composite first operating member or arm 38 receive ball bearings 47 and 48 to journal a second upright shaft 49 of the improved gear train of the mechanism, which shaft has a 32 tooth operating spur gear member or pinion 50 secured thereto intermediate bearings 47, 48. Pinion 50 (FIG. 1) meshes directly with and between the equal-sized idler pinions 42, 43, hence is rotated at equal speed but oppositely by the latter as they planet about fixed gear 30.

In the interest of having terminology consistent with that of the claims, either of the idlers 44, 45 may be referred to as a "first" gear member, and the pinion 50 as a "second" gear member.

As best shown in FIG. 3, the upper portion 52 of shaft 49, as journaled adjacent the outer end of first operating arm 38, has a second radial operating member or arm 53 fixedly secured thereto by a key 54, so that the rotation of shaft 49 by the second or operating gear member or pinion 50 occasions a corresponding rotation of second arm 53 while it orbits with its pinion about the axis of fixed base gear 30.

Arm 53 is apertured adjacent its outer end to receive a pair of ball bearings 55 (FIG. 3), which journal an upright stub shaft 56 for free swiveling action in relation to arm 53 as the latter travels compoundly in the manner described above. Shaft 56 is provided at its top with a two-part clamp device 57 of a suitable nature to secure to the shaft an elongated transfer bar 58 of the type in common usage in machine tool transfer equipment.

Typically also, the bar 58 carries a series of longitudinally spaced pushers or dogs 59 to engage behind workpieces, palletized or otherwise, or other load units to index or otherwise move the latter rectilinearly, as past a line of machine tools (not shown). The harmonic stroke mechanism 10 of the invention may be located at any desired point along the length or at the end of its associated transfer bar 58, preferably the former in the interest of balance.

The use of two idler spur gears 44, 45 instead of one has the effect of halving the tooth load thereof; and it is obvious that a single idler would and does suffice, with no significant alteration of the structure save for the fact that an unsymmetrically shaped first operating member or arm 38 is employed. However, in any instance involving a spur gear operation about a fixed base gear, an idler is necessary for the desired rotation-reversing and compensating at the load unit.

On this assumption, FIG. 4 represents a schematic in which a single idler is employed, having its axis in a plane line including the axes of the fixed gear and the second gear member or pinion. FIG. 4 has the effect of facilitating an understanding of the general arrangement of parts of the spur gear train and operating arms; and parts corresponding to those described in connection with FIGS. 1, 2 and 3 are designated by corresponding numbers. The mechanism is shown with the first and second operating arms 38, 53 fully extended on a straight line through their rotative axes and that of idler gear member or pinion 44. This is in the condition in which the transfer bar has come to what is in effect an instantaneous halt at either the commencement or the termination of the indexing stroke; and the transfer bar (not shown) moves on the same straight line throughout the entire transfer cycle.

FIG. 5 is also a schematic, which illustrates in solid line the extended linear condition of first operating arm 38 and second operating arm 53, just referred to. This, it will be assumed, it at the commencement of the indexing stroke. As first arm 38 is rotated by the power train and sun and planet-type gear train, it swings counterclockwise to and through the 45° position shown in dot-dash line, the associated second operating arm 53 swinging reversely clockwise about its pivotal axis on arm 38 to its position also shown in dot-dash line. During this intial phase, the end of arm 53 to which the transfer bar is swiveled accelerates variably as a function of the sine of the changing arm inclination, the arm end, clamp device and transfer bar reaching a maximum speed when the first operating arm 38 is at 90° relative to the solid line position. Passing this maximum speed zone, deceleration takes place, again at a variable harmonic rate, through the left-hand 45° dot-dash line position, until the second arm 53 comes to an effectively instantaneous halt at the end of the stroke, as shown in dotted line, in alignment through the axis of fixed gear 30 with the initial solid line position of FIG. 5. Starting and stopping of the indexed load take place without shock, stress on parts being reduced to a minimum and making it possible for the mechanism 10 to be constructed of relatively lightly designed parts and very compactly, considering the magnitude of the loads handled.

Typically, again with reference to schematic FIG. 4, the radial length L of second operating member 53 between its rotative axis at shaft 52 and the center point of its stroke imparting clamp member 57 is 15 inches and the radial distance L' between said rotative axis and that of the first operating member 38 at shaft 25 is the same. Thus, the total length of the transfer bar stroke is 60 inches, and in the typical embodiment instanced above this stroke is accomplished in an overall period of 3 seconds, still with the gradual acceleration and deceleration advantages mentioned above.

FIG. 6 illustrates an alternative drive mechanism 60 which is powered by hydraulic cylinder means, generally designated by the reference numeral 62. This includes an hydraulically operated plunger 63 operating conventionally in a cylinder 64, with appropriate coupling means, generally designated 65, connecting the end of the plunger to an elongated rack 66. The free end of this rack is sheathed in an appropirate tubular protective housing 67.

Rack 66 drivingly engages a large diameter pinion member or gear 68; and a further, smaller diameter gear 69 coaxially secured to member 68 represents the equivalent of the main drive gear 24 of the embodiment 10 of FIGS. 1–3, driven by a worm and worm gear set. Otherwise, the alternative mechanism of FIG. 6 has sun and planetary-type operating arm and spur gear means such as have been described before, so that further elaboration in this respect is deemed unnecessary and undesirable.

What is claimed is:

1. A transfer bar or like mechanism, comprising a member having means engageable with a load unit to movably operate the latter, and means operatively connected to said member to impart a reciprocatory stroke of a variable nature to said member, thus to similarly operate the load unit, said means comprising a fixed gear, a rotative drive gear journaled coaxially of said fixed gear, a first operating member coaxially secured to said drive gear for rotation about a common axis, a first gear member journaled by said operating member radially outwardly of said common axis, said gear member meshing with said fixed gear to travel planetarily about the latter upon rotation of said drive gear and operating member, a second gear member journaled by said operating member, said second gear member meshing with said first gear member and also planeting about the fixed gear while rotating about its own axis, and a second operating member coaxially secured to said second gear member to rotate about the latter's axis, said second operating member having means radially spaced from the last-named axis to operatively couple said second operating member with said first named member for said variable rectilinear stroke of the latter due to the compound action of said fixed gear, drive gear and gear members.

2. A transfer bar or like mechanism, comprising an elongated transfer bar having means engageable with a load unit to forward the latter, and means operatively connected to said bar to impart a rectilinear, reciprocatory advance and retract stroke of a variable harmonic nature to said bar, thus to similarly forward the load unit, said means comprising a fixed gear of substantial diameter and tooth number, a rotative drive gear journaled coaxially of said fixed gear, a first operating member of substantial radial extent coaxially secured to said drive gear for rotation about a common axis, a first gear member journaled by said operating member radially outwardly of said common axis, said gear member meshing with said fixed gear to travel planetarily about the latter upon rotation of said drive gear and operating member, a second gear member journaled by said operating member, said second gear member meshing with said first gear member and also planeting about the fixed gear while rotating about its own axis, and a second operating member of substantial radial extent coaxially secured to said second gear member to rotate about the latter's axis, said second operating member having means radially spaced from the last-named axis to operatively couple said second operating member with said transfer bar for said harmonic rectilinear stroke of the latter due to the compound action of said fixed gear, drive gear and gear members.

3. The mechanism of claim 1, and further comprising plural gear means rotatively operated from a prime mover and drivingly connected to said drive gear to rotate the latter at a greatly reduced speed ratio as compared with the speed of rotative operation of said plural gear means by said source.

4. The mechanism of claim 2, and further comprising plural gear means rotatively operated from a prime mover and drivingly connected to said drive gear to rotate the latter at a greatly reduced speed ratio as compared with the speed of rotative operation of said plural gear means by said source.

5. The mechanism of claim 3, in which said plural gear means comprises a toothed member meshing with said drive gear and of substantially smaller diameter and tooth number than the latter, and rotative means driving said toothed member from said source.

6. The mechanism of claim 4, in which said plural gear means comprises a toothed member meshing with said drive gear and of substantially smaller diameter and tooth number than the latter, and rotative means driving said toothed member from said source.

7. The mechanism of claim 6, in which said last named rotative drive means comprises a motor-driven worm and worm gear set, the worm gear of which drives said toothed member.

8. The mechanism of claim 6, in which said last named rotative drive means comprises a fluid pressure-operated rack and pinion set, the pinion of which drives said toothed member.

9. The mechanism of claim 1, in which said first and second operating members each comprise an elongated, radially extending arm, said second gear member and arm being pivotally carried on the first operating member arm at a point radially outward of the axis of rotation of the latter and the drive gear, said coupling means being pivotally carried on said second operating member arm at a point radially outward of the axis of rotation of said second arm and said second gear member.

10. The mechanism of claim 2, in which said first and second operating members each comprise an elongated, radially extending arm, said second gear member and arm being pivotally carried on the first operating member arm at a point radially outward of the axis of rotation of the latter and the drive gear, said coupling means being pivotally carried on said second operating member arm at a point radially outward of the axis of rotation of said second arm and said second gear member.

11. The mechanism of claim 4, in which said first and second operating members each comprise an elongated, radially extending arm, said second gear member and arm being pivotally carried on the first operating member arm at a point radially outward of the axis of rotation of the latter and the drive gear, said coupling means being pivotally carried on said second operating member arm at a point radially outward of the axis of rotation of said second arm and said second gear member.

12. The mechanism of claim 6, in which said first and second operating members each comprise an elongated, radially extending arm, said second gear member and arm being pivotally carried on the first operating member arm at a point radially outward of the axis of rotation of the latter and the drive gear, said coupling means being pivotally carried on said second operating member arm at a point radially outward of the axis of rotation of said second arm and said second gear member.

13. The mechanism of claim 10, in which said first and second gear members are of substantially smaller diameter and tooth number than said fixed gear, the first gear member being an idler and the axis of the second gear being radially outward of that of said idler.

14. The mechanism of claim 11, in which said first and second gear members are of substantially smaller diameter and tooth number than said fixed gear, the first gear member being an idler and the axis of the second gear being radially outward of that of said idler.

15. The mechanism of claim 12, in which said first and second gear members are of substantially smaller diameter and tooth number than said fixed gear, the first gear member being an idler and the axis of the second gear being radially outward of that of said idler.

16. A transfer of related mechanism, comprising a first rotatable operating member, a second operating member rotatable on said first member on an axis laterally spaced from and paralleling that of the first member, means on said second operating member to connect the same to an elongated operated member, said last named means being laterally spaced from the rotative axis of said second operating member, and mating gear-type means operatively connecting said operating members to one another in a manner whereby upon rotation of said first member to carry said second member bodily therewith, said second member is moved in a manner to move said first named means and said operated member in a rectilinear path of harmonic motion characterized by a variable rate of acceleration and/or deceleration.

17. The mechanism of claim 16, in which said mating gear-type means operatively connecting said operating members to one another is a spur gear train.

18. A transfer or related mechanism, comprising a first rotatable operating member, a second operating member rotatable on said first member on an axis laterally spaced from and paralleling that of the first member, means on said second operating member to connect the same to an elongated operated member, said last named means being laterally spaced from the rotative axis of said second operating member, and means operatively connecting said operating members to one another in a manner whereby upon rotation of said first member to carry said second member bodily therewith said second member is moved in a manner to move said first named means and said operated member in a rectilinear path of harmonic motion characterized by a variable rate of acceleration and/or deceleration, said means operatively connecting said operating members to one another being a spur gear train including a fixed sun gear whose axis is that of said first operating member, a first rotatable gear member on an axis paralleling that of the latter, said first gear member meshing with and planeting about said sun gear upon rotation of the first operating member, a second rotatable gear member also journaled on said first operating member, said first and second gear members meshing with one another, said second operating member being rotatable with said second gear member and said first named connecting means being laterally spaced from the rotative axis of said second members.

19. A transfer or related mechanism, comprising a first rotatable operating member, a second operating member rotatable on said first member on an axis laterally spaced from and paralleling that of the first member, means on said second operating member to connect the same to an elongated operated member, said last named means being laterally spaced from the rotative axis of said second operating member, and means operatively connecting said operating members to one another in a manner whereby upon rotation of said first member to carry said second member bodily therewith said second member is moved in a manner to move said first named means and said operated member in a rectilinear path of harmonic motion characterized by a variable rate of acceleration and/or deceleration, said operating members being arms, the first of which has said first gear member journaled thereon intermediate its arm length, the second operating member arm being journaled adjacent one end thereof on the first arm, said first named connecting means being located adjacent the other end of the second arm.

20. A transfer or related mechanism, comprising a first rotatable operating member, a second operating member rotatable on said first member on an axis laterally spaced from and paralleling that of the first member, means on said second operating member to connect the same to an elongated operated member, said last named means being laterally spaced from the rotative axis of said second operating member, and means operatively connecting said operating members to one another in a manner whereby upon rotation of said first member to carry said second member bodily therewith said second member is moved in a manner to move said first named means and said operated member in a rectilinear path of harmonic motion characterized by a variable rate of acceleration and/or deceleration, said means operatively connecting said operating members to one another being a spur gear train, said operating members being arms, the first of which has said first gear member journaled thereon intermediate its arm length, the second operating member arm being journaled adjacent one end thereof on the first arm, said first named connecting means being located adjacent the other end of the second arm.

21. A transfer or related mechanism, comprising a first rotatable operating member, a second operating member rotatable on said first member on an axis laterally spaced from and paralleling that of the first member, means on said second operating member to connect the same to an elongated operated member, said last named means being laterally spaced from the rotative axis of said second operating member, and means operatively connecting said operating members to one another in a manner whereby upon rotation of said first member to carry said second member bodily therewith said second member is moved in a manner to move said first named means and said operated member in a rectilinear path of harmonic motion characterized by a variable rate of acceleration and/or deceleration, said means operatively connecting said operating members to one another being a spur gear train including a fixed sun gear whose axis is that of said first operating member, a first rotatable gear member on an axis paralleling that of the latter, said first gear member meshing with and planeting about said sun gear upon rotation of the first operating member, a second rotatable gear member also journaled on said first operating member, said first and second gear members meshing with one another, said second operating member being rotatable with said second gear member and said first named connecting means being laterally spaced from the rotative axis of said second members, said operating members being arms, the first of which has said first gear member journaled thereon intermediate its arm length, the second operating member arm being journaled adjacent one end thereof on the first arms, said first named connecting means being located adjacent the other end of the second arm.

22. The mechanism of claim 21, in which said first and second arms are straight and in longitudinal alignment with one another at opposiite ends of said path.

23. A mechanical motion mechanism, comprising a first rotatable operating member, a second operating member rotatable on said first member on an axis laterally spaced from and paralleling that of the first member, said second operating member having means spaced from the rotative axis thereof and adapted to perform a useful function, and mating gear-type means operatively connecting said operating members to one another in a manner whereby, upon rotation of said first member to carry said second member bodily therewith, said second member is moved in a manner to cause said performing means thereon to follow a rectilinear path of harmonic motion characteriized by a variable rate of acceleration and/or deceleration.

24. The mechanism of claim 23, in which said mating gear-type means operatively connecting said operating members to one another is a spur-gear train.

25. A mechanical motion mechanism, comprising a first rotatable operating member, a second operating member rotatable on said first member on an axis laterally spaced from and paralleling that of the first member, said second operating member having means spaced from the rotative axis thereof and adapted to perform a useful function, and means operatively connecting said operating members to one another in a manner whereby, upon rotation of said first member to carry said second member bodily therewith, said second member is moved in a manner to cause said performing means thereon to follow a rectilinear path of harmonic motion characterized by a variable rate of acceleration and/or deceleration, said means operatively connecting said operating members to one another being a spur-gear train including a fixed sun gear whose axis is that of said first operating member, a first rotatable gear member journaled on said first operating member on an axis paralleling that of the latter, said first gear member meshing with and planeting about said sun gear upon rotation of the first operating member, a second rotatable gear member also journaled on said first operating member, said first and second gear members meshing with one another, said second operating member being rotatable with said second gear member and said performing means being laterally spaced from the rotative axis of said second members.

26. A mechanical motion mechanism, comprising a first rotatable operating member, a second operating member rotatable on said first member on an axis laterally spaced from and paralleling that of the first member, said second operating member having means spaced from the rotative axis thereof and adapted to perform a useful function, and means operatively connecting said operating members to one another in a manner whereby, upon rotation of said first member to carry said second member bodily therewith, said second member is moved in a manner to cause said performing means thereon to follow a rectilinear path of harmonic motion characterized by a variable rate of acceleration and/or deceleration, said operating members being arms, the first of which has said first gear member journaled thereon intermediate its arm length, the second operating member arm being journaled adjacent one end thereof on the first arm, said performing means being located adjacent the other end of the second arm.

27. A mechanical motion mechanism, comprising a first rotatable operating member, a second operating member rotatable on said first member on an axis laterally spaced from and paralleling that of the first member, said second operating member having means spaced from the rotative axis thereof and adapted to perform a useful function, and means operatively connecting said operating members to one another in a manner whereby, upon rotation of said first member to carry said second member bodily therewith, said second member is moved in a manner to cause said performing means thereon to follow a rectilinear path of harmonic motion characterized by a variable rate of acceleration and/or deceleration, said means operatively connecting said operating members to one another being a spur-gear train, said operating members being arms, the first of which has said first gear member journaled thereon intermediate its arm length, the second operating member arm being journaled adjacent one end thereof on the first arm, said performing means being located adjacent the other end of the second arm.

28. The mechanism of claim 25, in which said operating members are arms, the first of which has said first gear member journaled thereon intermediate its arm length, the second operating member arm being journaled adjacent one end thereof on the first arm, said performing means being located adjacent the other end of the second arm.

29. The mechanism of claim 28, in which said first and second arms are straight and in longitudinal alignment with one another at opposite ends of said path.

30. The mechanism of claim 12, in which said first and second gear members are of the spur-gear type and have the same diameter and number of teeth, the distance between the axes of said fixed gear and said second gear member equalling the radial distance between the second gear member axis and said coupling means.

31. The mechanism of claim 13, in which said first and second gear members are of the spur-gear type and have the same diameter and number of teeth, the distance between the axes of said fixed gear and said second gear member equalling the radial distance between the second gear member axis and said coupling means.

32. A transfer or related mechanism, comprising a first rotatable operating member, a second operating member rotatable on said first member on an axis laterally spaced from and paralleling that of the first member, means on said second operating member to connect the same to an operated member, said last named means being laterally spaced from the rotative axis of said second operating member, and means operatively connecting said operating members to one another in a manner whereby upon rotation of said first member to carry said second member bodily therewith said second member is moved in a manner to move said first named means and said operated member in a rectilinear path of harmonic motion characterized by a variable rate of acceleration and/ or deceleration, said means operatively connecting said operating members to one another being a spur-gear train including a fixed sun gear whose axis is that of said first operating member, a first rotatable gear member on an axis paralleling that of the latter, said first gear member meshing with and planeting about said sun gear upon rotation of the first operating member, a second rotatable gear member also journaled on said first operating member, said first and second gear members meshing with one another, said second operating member being rotatable with said second gear member and said first named connecting means being laterally spaced from the rotative axis of said second members, said first and second spur gear members having the same diameter and number of teeth, the distance between the axes of said fixed gear and said second gear member equalling the radial distance between the second gear member axis and said connecting means on said second operating member.

33. The mechanism of claim 25, in which said first and second spur gear members have the same diameter and number of teeth, the distance between the axes of said fixed gear and said second gear member equalling the radial distance between the second gear member axis and said performing means.

References Cited

UNITED STATES PATENTS

| | | | |
|---|---|---|---|
| 590,929 | 9/1897 | Youngken | 74—25 |
| 856,295 | 6/1907 | Prindle | 74—660 |
| 2,274,937 | 3/1942 | Raulerson | 74—41 |
| 2,713,274 | 5/1956 | Lockwood | 74—660 |

FOREIGN PATENTS 523,846 11/1953 Belgium.

FRED C. MATTERN, Jr, Primary Examiner